United States Patent [19]

Fowler et al.

[11] 4,021,048

[45] May 3, 1977

[54] CARRIER ACCESSORY FOR USE WITH RECORD DISCS ON PHONOGRAPHS

[75] Inventors: Allan R. Fowler, Santa Ana; Alfred W. Bolls, Foster City, both of Calif.

[73] Assignee: Duovel Company, Irvine, Calif.

[22] Filed: Feb. 3, 1975

[21] Appl. No.: 546,741

Related U.S. Application Data

[63] Continuation of Ser. No. 413,785, Nov. 8, 1973, abandoned.

[52] U.S. Cl. .............................. 274/1 R; 274/42 R
[51] Int. Cl.² ......................................... G11B 3/62
[58] Field of Search ...................... 274/1 R, 42 R; 206/309–313

[56] References Cited

UNITED STATES PATENTS

| | | | |
|---|---|---|---|
| 2,426,241 | 8/1947 | Rodman | 274/1 R |
| 2,501,465 | 3/1950 | Cavawamoff | 274/42 R |
| 2,906,536 | 9/1959 | Mauerhoff | 274/42 R |
| 3,169,023 | 2/1965 | Rivas | 274/42 R |
| 3,189,353 | 6/1965 | Grado | 274/47 |
| 3,422,952 | 1/1969 | George | 206/313 |
| 3,540,736 | 11/1970 | Pallie | 274/42 R |
| 3,767,865 | 10/1973 | Schuller | 274/42 R |
| 3,854,729 | 12/1974 | Dowms | 274/1 R |

*Primary Examiner*—Richard E. Aegerter
*Assistant Examiner*—John W. Shepperd
*Attorney, Agent, or Firm*—Allan R. Fowler

[57] ABSTRACT

Disclosed is a free and separate carrier accessory adapted to underlie, carry and drop with a phonograph record through the changing and playing operation on the spindle of a record changer, the accessory including a generally disc-like metallic supporting body having a diameter equal to the record and having top and bottom shells connected together to form an elevated hollow central hub, an elevated hollow outer rim, and a flat annular flange joining the rim with the hub. The hub includes a free cap having a spindle hole therein, the cap being captured in a central opening of the hub and adapted for support in juxtaposition to an overlying record. Layers of flexible cushioning material in the form of annuli of precision cut upright pilefabric are attached respectively on opposite sides of the flange for engaging the recording area of overlying and underlying records. In use such accessories may be interleaved in a record stack for stack storage or for stack play on an automatic record changing phonograph; and, a single accessory may be used as a free turntable cover.

14 Claims, 13 Drawing Figures

CARRIER ACCESSORY FOR USE WITH RECORD DISCS ON PHONOGRAPHS

RELATED APPLICATION

This is a continuation of Application Ser. No. 413,785, filed Nov. 8, 1973 now abandon entitled CARRIER ACCESSORY FOR USE WITH RECORD DISCS ON PHONOGRAPHS.

This invention related to protective pads and coupling devices for phonograph records, and more particularly relates to a free and separate carrier accessory adapted to underlie and carry the record in the playing operation on a phonograph.

For many years there has existed a need for a practical and acceptable means for cushioning and frictionally coupling phonograph records so that they can be employed in stacked relationship on the changer spindle and turntable of a phonograph without scarring the recorded surfaces or distorting the reproduced composition as a result of record slippage relative to the rotary position of the turntable. Indeed, many persons who value their phonograph records and are serious music listeners continue to refuse the convenience of an automatic record changer and instead employ a manual change turntable where the phonograph records are played singly, thereby incurring the very considerable inconvenience and disruption of having to manually change each record after one side is played.

Moreover, it is a very convenient expedient to leave a stack of records on the turntable or elsewhere rather than immediately returning them to their protective record jackets after play. However, some records are quite slippery when stacked on one another or placed on a smooth flat surface and, if stacked off the turntable, the stack is easily accidently disrupted which could cause scarring of the recorded areas. Also, stacked on or off the turntable, if any one of the records in the stack is significantly warped this warpage might be transmitted to some degree to other records in the stack after a considerable period of time.

Any solution to the problem of providing the needed protective and coupling functions is complicated by the great variety of record changer mechanisms in common home use today and be the fact that different records have different cross-sectional shapes, some uniform but at different thicknesses and others non-uniform with the central label area and/or outer rim being thicker than the recording area to different degrees. While there have been a number of compromise proposals for accessories which exclusively engage the central label area or outer rim of the record allegedly to perform protective and coupling functions in a record stack and usually involving some modification or physical attachment to each record, so far as is known, no such accessory to date has achieved significant acceptance and for all practical purposes the problem remains unsolved.

Ideally it would be desirable to have a record pad and coupling accessory of universal application regardless of record configuration or changer mechanism which performs perfectly all of the cushioning, protection and coupling functions without introducing any additional problems. The device should be attractive, durable, easily handled during use, light weight, and easily cleaned. The device also should add a minimum of thickness to a record stack and should not require any physical attachment to or modification of the records, record changers or turntables. Further, the device should have a rigid structural integrity, the ability to capture abrasive dust particles without retaining them on its outer surface, and no doubt other qualities such as cushioning or damping mechanical vibrations, discharging static electricity from the record, and suppressing electric fields emanating from the record due to static charges.

While the ideal universal accessory may never be achieved, our invention is considered to be a major step in this direction.

In accordance with our invention, a free and separate carrier accessory is adapted to underlie, carry and drop with the record disc through the changing and playing operation on the spindle of a record changer. The accessory includes a generally disc-like supporting body having an overall diameter approximately equal to that of the record disc. The body includes a substantially flat annular flange which surrounds and extends outwardly from an elevated central hub having a spindle hole therein. And, layers of flexible cushioning material are attached respectively on opposite sides of the flange for engaging the recording area of overlying and underlying record discs.

We have discovered that velvet, a precision cut upright pile fabric, is especially suitable for the accessory, and that significant advantage is gained by using an annulus of velvet which protrudes above any permanently elevated portions of the hub and has an inside diameter which is greater than the diameter of the record label area, so as to form an accommodating nest for the label areas of records whose label areas are thickened or elevated.

An accessory constructed in accordance with our invention makes an excellent turntable cover, easily removed to be cleaned. Of course, if it is to be used only in this mode, the velvet annulus need be used only on the top side of the accessory and the device need not be adapted through hub elevation or other measures to drop with the record on a changer mechanism.

In accordance with a preferred embodiment of our invention, we use a body of light-weight non-ferrous metal having an elevated hollow central hub and an elevated hollow outer rim, the respective outer and inner perimeters of which approximately match the perimeters of the annular recording and leadout area on the record and form circular abutment edges for the cushioning material, such that the cushioning material is secure and engages solely in the recessed area of a record having a thickened rim and label area.

To best adapt the accessory for dropping with an overlying record disc through the changing operation on the spindle of a record changer, the hollow central hub has a central opening therethrough, and a cap is mounted for limited vertical movement through said central opening with the cap having the spindle hole therein.

The above and additional important aspects of our invention are explained in detail in the following description taken in conjunction with the accompanying drawings, in which.

Figure 4:
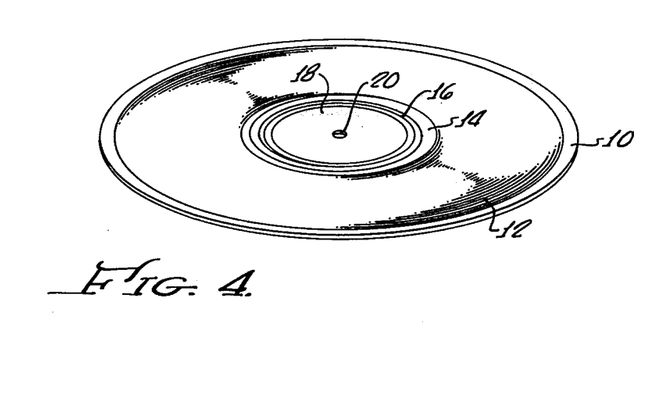
FIG. 4 is a perspective view of a conventional nominally 12 inch diameter phonograph record disc illustrating the various annular areas on the disc.
Figure 7A:
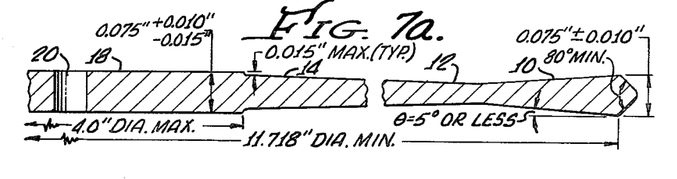
FIG. 7(a) is a fragmentary diagrammatic view of the cross-section of a nominally 12 inch diameter phonograph record disc, illustrating in part the EIA standards for dimensional tolerances of record discs having raised rims and label areas.
Figure 7B:
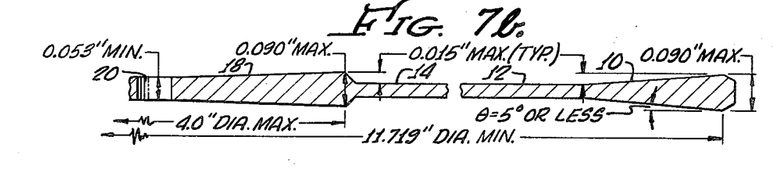
FIG. 7(b) is a fragmentary diagrammatic view of the cross-section of a nominally 12 inch diameter phonograph record disc, illustrating in part the IEC standards for dimensional tolerances of record discs having raised rims and label areas.

Referring first for background to FIGS. 4 and 7, a conventional nominally 12 inch diameter phonograph record disc has, typically on each side thereof, an outer rim area 10 containing a lead-in groove spiral (not shown), a recording area 12 containing spiral grooves in which the recorded information is embodied, a lead-out area 14 surrounded by the recording area and containing a spiral groove of high pitch which ends in a finishing circle groove 16 to carry the tone arm of the phonograph to an inward position that initiates its return cycle and, on an automatic changer, ultimately the dropping of another record to be played. Interior of the recording and leadout areas 10, 14 is a circular label area 18, centered in which is a spindle hole 20. The same reference numerals are used for corresponding record portions in FIGS. 4, 7(a) and 7(b) for purposes of easy correlation.

The dimensional standards for phonograph record discs have been established by the International Electrotechnical Commission, abbreviated IEC, an affiliate to the International Organization for Standardization, and by the Electronic Industries Association, abbreviated EIA, in accordance with IEC publication 98 and EIA specification RS-211-C respectively.

In some respects so far as is of concern here the EIA and IEC dimensional standards are essentially the same for all types of nominally 12 inch diameter records. The outer diameter of the record is $11.875 \pm 0.031$ inches, the maximum diameter of the recording area is 11.50 to 11.52 inches, and the maximum diameter of the elevated or raised label area is 4 inches. Thickness standards however do vary depending upon the record type and the standard used. For example, the IEC standard for the thickness of flush of flat records whether 78 r.p.m. or 33⅓ r.p.m. is 0.059 to 0.090 inches; whereas, by EIA standards, for 78 r.p.m. it is $0.090 \pm 0.010$ inches, and for 33⅓ r.p.m. it is $0.075 \pm 0.010$ inches. For recessed records, that is, records having raised label and rim areas so that the recording area is recessed, the EIA standard is shown in FIG. 7(a) and the IEC standard is shown in FIG. 7(b).

As can be seen from the dimensional standards, a great deal of variation is permitted in the thickness and in the cross-sectional configuration of phonograph records, even among those of the same type; and, in order to accommodate the total thickness range permitted to nominally 12 inch records including both 78 r.p.m. and 33⅓ r.p.m., it would appear that the gravity drop types of automatic record changing mechanisms in common home use, which essentially are thickness discriminators set to select the lower of stacked records by addressing the area in the immediate vicinity of the center or spindle hole of the records, would have to discriminate at about 1/10 inch or slightly more.

The record changer mechanisms in common home use today employ different types of thickness discriminators on the changer spindle. The changer spindle holds a stack of records in an elevated position relative to the turntable and, when actuated, drops only the bottom record which falls by gravity to the turntable. Two exemplary types of such spindles are shown in FIGS. 5 and 6.

Figures 5, 6:
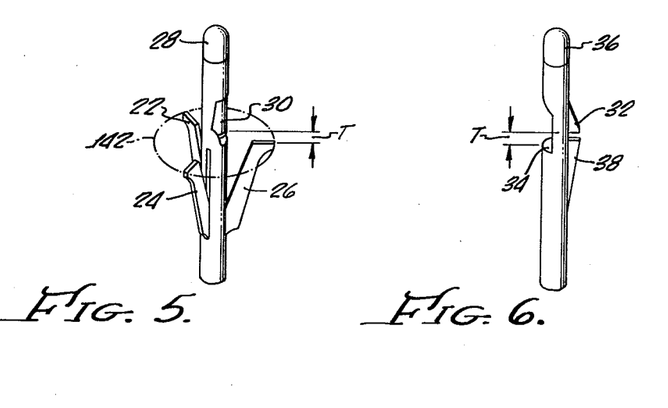
FIG. 5 is a fragmentary perspective view of one common form of automatic record changing spindle mechanism.
FIG. 6 is a fragmentary perspective view of another common form of automatic record changing spindle mechanism.

In FIG. 5, three prongs 22, 24, 26 are retractable to within the confines of the spindle 28 to drop the bottom record in a stack of records supported by the prongs. The record which overlies the bottom record and those overlying it in the stack are retained in the elevated position on the spindle by a jamming mechanism or retaining cam 30 which is actuated to protrude from the spindle and exert pressure within the spindle hole of the record that overlies the bottom record to be dropped. After the bottom record is dropped, the three prongs reemerge and the retaining cam 30 retracts so that the stack of records again falls onto the three prongs for support. The thickness discrimination, illustrated by the dimension "T", occurs between the top of the extended prongs and the lower portion of the retaining cam. For clarity, the mentioned records are not shown in the drawing.

In FIG. 6, a retaining cam 32 forces the bottom record in a stack to be supported on a ledge 34 of a spindle 36, with the upper portion of a changer cam 38 extending into the spindle hole of the lowermost record on the stack. When the record changer is actuated, the changer cam 38 moves inwardly of the spindle to push the lowermost record off the ledge so that it drops by gravity on the spindle to the turntable; however, the retaining cam which extends into the spindle hole of the record overlying the bottom record does not move inwardly, thereby retaining this overlying record in alignment with the ledge 34 so that when the bottom record drops and the changer cam 38 reemerges, the overlying record and any records overlying it in the stack drop down to the ledge 34 for support. The thickness discrimination occurs between the ledge 34 and the bottom of the retaining cam 32. For clarity of illustration of the mechanism, the records referred to are not shown in the figure.

Figure 1:
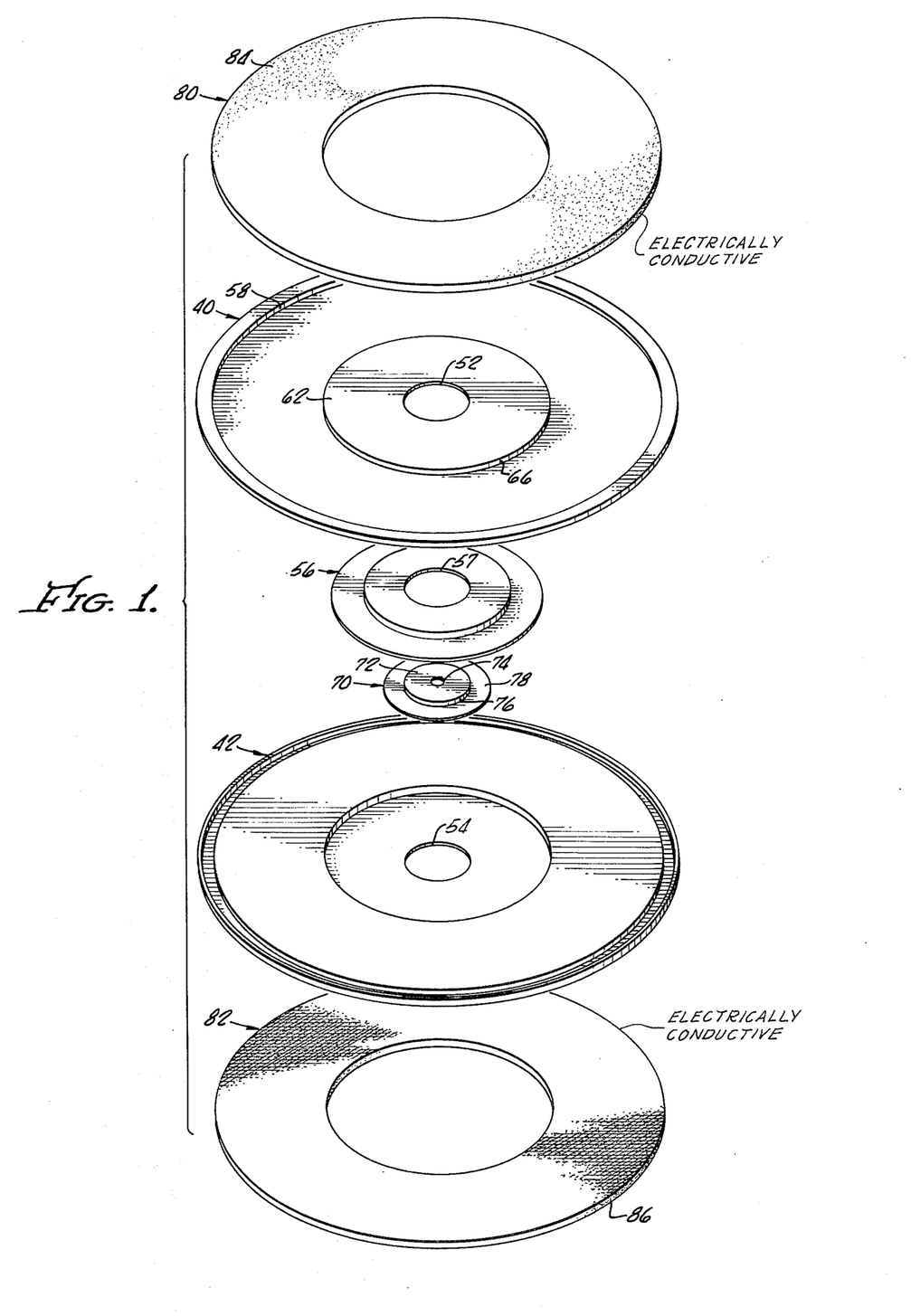
FIG. 1 is an exploded schematic view of a preferred embodiment of the record carrier accessory of the invention.
Figure 2A:
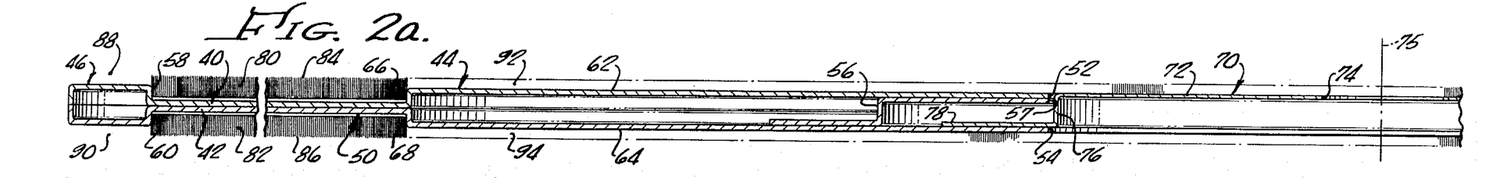
FIGS. 2(a) and 2(b) each are sectional elevations, partially cut away, of the record carrier accessory of FIG. 1.

Referring now to FIG. 1 and 2(a), a record carrier accessory constructed in accordance with a preferred embodiment of our invention includes a generally disc-like supporting body having an outside diameter at least approximately as large as that of the record disc with which it is designed to cooperate. The supporting body includes shaped circular top and bottom shells 40, 42 connected together to form an elevated hollow central hub 44, an elevated hollow outer rim 46, and a substantially flat annular flange 50 joining the rim with the hub. The body shells 40, 42 are identical, and are formed from 0.012 inch thick sheets of suitable aluminum alloy, a light-weight non-ferrous metal, and have relatively large central openings 52, 54 respectively therein, the central openings registering with one another. Adjacent these central openings and disposed between the shells is a reenforcing spacer 56 having a registering central opening 57 therein. The shells are connected together by a suitable permanent adhesive, joining the shells where they contact one another at the outer edge of the rim 46 and in the area of the annular flange 50, and joining the shells with the reenforcing spacer 56.

The laminated supporting body thus formed with raised hollow portions is light-weight, non-magnetic, thin and of enhanced rigidity. It is a simple precision structure easily formed, and has a high degree of structural integrity which resists warpage or other deformity. The exposed outer rim, and its having a diameter approximately equal to that of the record with which it is designed to cooperate, facilitates handling the accessory without contacting other areas of the accessory with the hands, facilitates centering of one or more accessories interleafed in a record stack, and facilitates handling of such a stack.

The elevated or raised outer rim 46 has an inner perimeter defined on the top and bottom body shells by circular abutment edges 58, 60 respectively. The width of the rim along the diameter of the accessory approximately corresponds in extent to the width of the rim area on the record, and the diameter of the circular abutment edges 58, 60 defining the inner perimeter of the rim 46 corresponds approximately to the outer diameter of the recording area on the record, all as is evident by inspection of FIGS. 8 through 11.

The hollow central hub 44 has raised top and bottom flat annular portions 62, 64, the inner perimeters of which are formed by the openings 52, 54 in the body shells and the outer perimeters of which are defined on the top and bottom shells by circular abutment edges 66, 68 having a diameter exceeding that of the record disc label area.

Figures 8, 9:
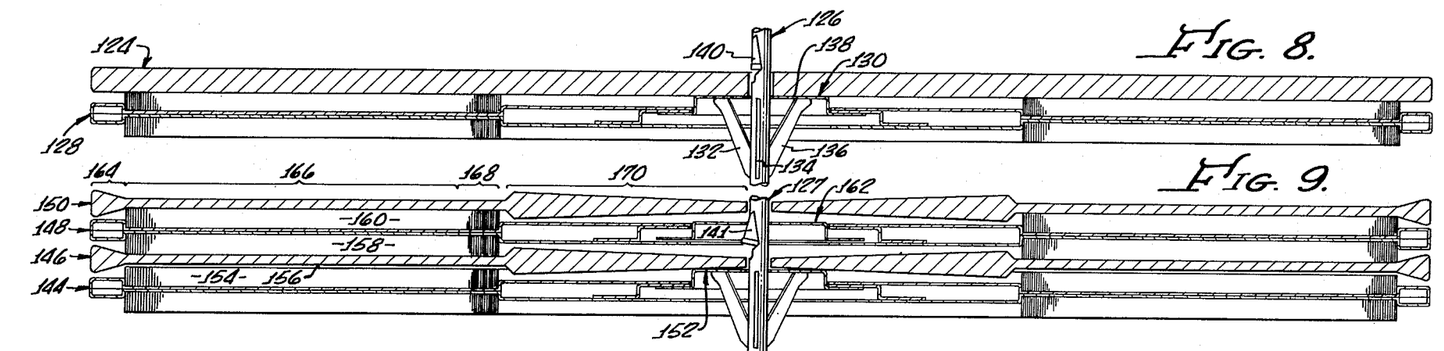
FIGS. 8, 9 and 10 are schematic fragmentary elevations, partially in section, illustrating records of different cross-sectional configuration in use with the record carrier accessory of FIG. 1 on the changer spindle of a phonograph; and, FIG. 11 is a schematic fragmentary elevation, partially in section, illustrating a stack of phonograph records interleafed with record carrier accessories on the turntable of a phonograph.
Figure 10:
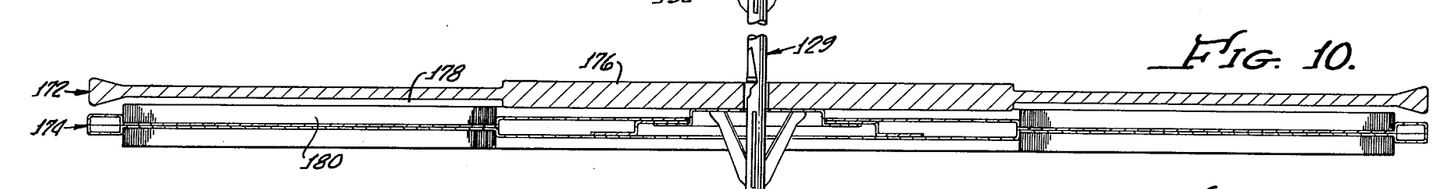

The hub 44 is a composite construction which includes not only the raised annular portions 62, 64 internally interconnected by the annular reinforcing spacer 56, but also includes a free hub cap 70 captured in the registered central openings 52, 57 in the top shell 40 and spacer 56 respectively. The cap has a flat rigid upper plate portion 72 which spans the registered central openings 52, 54, 57 and is fully exposed on both its top and bottom sides by said openings. The plate portion 72 of the cap is circular and has a central spindle hole 74 therein, the axis 75 of which lies normal to the hub and constitutes the effective central axis of the body. The cap includes a circular skirt portion 76 which depends downwardly from the perimeter of the circular plate 72, and a flange portion 78 which extends laterally from the lower perimeter of the skirt 76. The annular flange portion 78 of the cap is captured between the top and bottom shells, or more particularly between the bottom shell and the annular spacer 56, for limiting vertical movement of the free cap to between the position shown in FIG. 2(a), where the plate portion 72 is approximately flush with the upper annular hub portion 62, and a position where the plate portion 72 and supporting skirt protrudes above the upper annular hub portion 62, for example as illustrated in FIGS. 8, 9 and 10. When the cap moves, the skirt portion 76 loosely engages the perimeter of the registering openings 52, 57 in the top shell and reinforcing spacer so as to restrict lateral movement of the cap to a negligible degree of movement.

The cap 70 is formed from 0.010 inch thick stainless steel sheet so that it has good structural rigidity and is not damaged or scored by engagement with the other aluminum parts or with changer mechanisms. Being small and relatively thin, it adds negligible weight to the carrier accessory. Also, its upper plate 72, being thin compared to the hub 44 and flange 50, adds a minimum of changer effective thickness to an overlying record when in the ready-to-drop position on a record changer. Further, since the cap plate is offset toward the top of the accessory, that is the lower position of the cap plate is well over the lower annular hub portion 64, the overlying accessory will not drop with an underlying record.

Upper and lower layers 80, 82 of flexible compressible cushioning material are disposed on opposite sides of the flange 50 concentrically with the body for engaging the recording area of overlying and underlying record discs. The upper layer 80 is in the form of an annulus of velvet or precision cut upright pile fabric disposed concentrically on the body and extending between the respective abutment edges 58, 66 of the rim and hub, the fabric being connected to the flange 50 and abutment edges 58, 66 by a suitable permanent adhesive. The abutment edges 58, 66 frame the velvet annulus accurately, preserve appearance, prevent raveling, and protect the perimeter of the fabric annulus from wear and abuse. Similarly, the lower layer 82 is in the form of an annulus of velvet or precision cut upright fibrous pile fabric disposed concentric on the body and extending between the abutment edges 60, 68 of the rim and hub, the annulus being similarly connected to the flange 50 and abutment edges 60, 68 by suitable permanent adhesive.

The upper and lower velvet annuli 80, 82 each have flat outer surfaces or surface zones 84, 86 defined by the free ends of the upright pile at an accurately predetermined level above or outward from the respective abutment edges of the hub and rim; or, stated differently, the velvet annuli 80, 82 are of sufficient thickness to protrude a known distance above the hub and rim. This protrusion of the cushioning material in conjunction with the elevated hub and rim construction accounts for annular relief spaces 88, 90 disposed above and below the rim for accommodating thickened rims of overlying and underlying records, and accounts for relieved areas or nests 92, 94 above and below the hub 48 for accommodating thickened record label areas of overlying and underlying record discs. Thus, regardless of record configuration within the standards, the outer surfaces 84, 86 of the upper and lower cushioning layers 80, 82 constitute the sole engagement with overlying and underlying record discs, except when the overlying disc is in the ready position on the spindle of a record changer when rotary coupling is of no consequence. The area of the record disc engaged is of course the recording and lead-out areas, the velvet annuli fitting within the confines of those combined annular areas and constituting the sole engagement even with discs having recessed recording and lead-out areas.

The movable hub cap 70 in its upwardly protruding position lies flush with or slightly above the upper surface 84 of the upper velvet layer 80. However, as seen in FIGS. 8 through 10, this occurs only when the carrier accessory underlies a record in the ready-to-drop position on the spindle of a record changer.

Figure 2B:
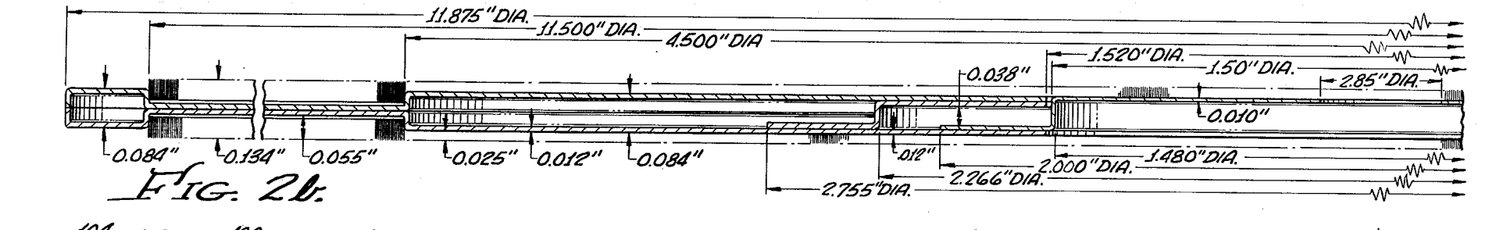

FIG. 2(b) illustrates the same structure as is shown in FIG. 2(a), except that reference numerals are not utilized so that the dimensions may be clearly shown. For use with nominally 12 inch records, the dimensions shown in FIG. 2(b) can be compared with the EIA and the IEC dimensional standards for such records.

Figure 3:
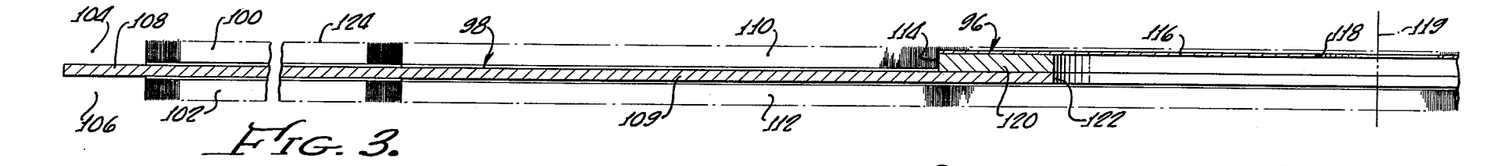
FIG. 3 is a sectional elevation, partly cut away, illustrating another record carrier accessory embodying important aspects of our invention.

Referring now to FIG. 3, many of the basic features of our invention are embodied in the construction there depicted, this construction corresponding to our original prototypes which we successfully tested. In this construction, the body of the record carrier accessory includes an elevated central hub 96 and a substantially flat annular flange 98 surrounding and extending outwardly from the elevated hub. Top and bottom annuli of flexible cushioning material 100, 102 are attached with permanent adhesive concentrically on the top and bottom sides of the flange, and surround the elevated hub for engaging the recording area of overlying and underlying record discs. The cushioning material used is velvet of 0.055 inches thickness, and the respective annular layers 100, 102 have inside diameters which exceed the diameter of the label area on the record, and outside diameters which are substantially equal to or slightly less than the outer diameter of the recording area on the record. Since the annuli protrude from the flange, annular reliefs or open spaces 104, 106 exist above and below an exposed outer rim portion 108 of the flange, and annular reliefs or open spaces 110, 112 exist above and below an exposed central portion 109 on the flange 98. These reliefs or open spaces accommodate the enlarged rims and label areas of overlying and underlying records to enhance engagement of the velvet layers with the recording areas on the records and provide a nesting which minimizes overall thickness of a record stack that includes interleaved record carrier accessories.

Like the preferred embodiment of FIGS. 1, 2(a), 2(b), in the embodiment of FIG. 3, the elevated hub 96 on the top side of the body includes a central cap portion 116 exposed on both sides and having a central spindle hole 118 therein, and means for supporting the central cap portion in protruding position for juxtaposition to an overlying record disc. The body has a central axis 119. While in the preferred embodiment the supporting means includes the cooperating structure of a hollow hub and vertically movable central cap, in the embodiment of FIG. 3 the central cap portion 116 is fixed in predetermined elevated position above the flange 98 by an annular spacer 120 cemented between the cap 116 and the flange 98, with the cap 116 bridging a large central opening 122 in the flange 98, so that it is exposed on both sides for a diameter several times the diameter of the spindle hole. The cap 116 is a flat circular member of 0.010 inch thick stainless steel, and is relatively thin compared to the flange 98 which is a tempered aluminum alloy of about double that thickness. Notably in FIG. 3, the top surface of the cap 116 resides slightly below the upper surface 124 of the upper layer of cushioning material by about 0.010 inches.

In regard to the FIG. 3 embodiment, while it lacks some of the important qualities of the preferred embodiment of our invention and is not nearly so adapted for universal use with all records and changers, we have found that it will work successfully although not optimally on some makes of record changers in conjunction with modern records manufactured in the United States which tend to be thinner than the maximum dimensional standards. Although the coupling qualities suffer, we have found that the same is essentially true even when the velvet layers cover the entire flange 98 from the outer edge of the rim portion 108 to the abutment edge 114 defining the outer perimeter of the hub 96.

Figure 11:
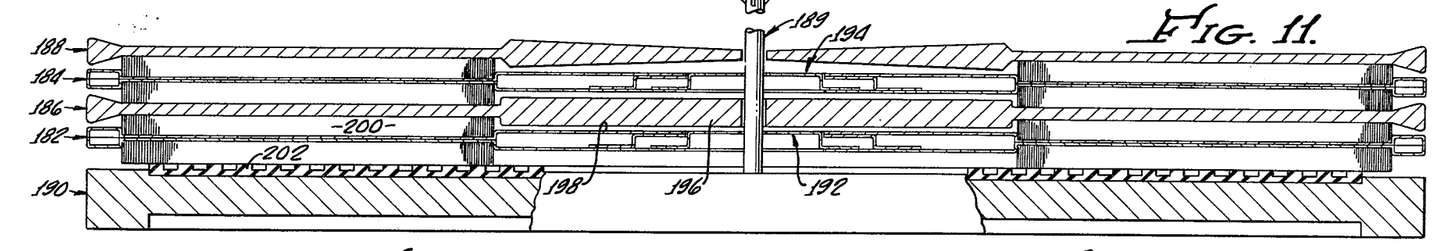

FIGS. 8 through 10 illustrate the cooperative relationships of the preferred embodiment of our invention with records of different cross-sectional configuration on a three pronged changer spindle of the type illustrated in FIG. 5, and in FIG. 11, on a turntable. Like FIG. 1, FIGS. 8 through 11 are schematic and are not drawn to scale. Mainly, it is the vertical scale that is exaggerated for purposes of clear illustration.

As seen in FIG. 8, a relatively thick flat phonograph record 124 is in the ready-to-drop position on a three pronged changed spindle 126 and overlies a record carrier accessory 128 also in the ready-to-drop position. The free cap 130 supported by the hub of the record carrier 128 is retained in its upwardly protruding position by engagement of the prongs 132, 134, 136 of the changer spindle with the underneath exposed side of the circular plate 138 of the cap 130. The record 124 is in turn supported by the top surface of the cap plate 138. Thus, the thickness of the cap plate 138 is added to the thickness of the record 124, and the combined thickness must fall within the thickness discrimination tolerance of the changer spindle so that the retaining cam 140 when activated does not retain the record 124, but instead retains the overlying carrier accessory or record (not shown) while the three prongs retract within the spindle to drop he carrier accessory 128 and record 124 in the ready position.

Since the cap adds effective thickness to the record and supports significant weight while the prongs slidably retract on the bottom surface of its plate, and since in some changer spindles the three prongs can describe an outer circle of considerable diameter, say on the order of one inch, for example as illustrated at 142 in FIG. 5, the function of having a relatively thin cap of hard metal and a flat top plate 138 of several times the diameter of the spindle hole exposed on both sides can be appreciated.

FIG. 9 illustrates a stack of carrier accessories interleaved with records on the same type changer spindle 127. A carrier accessory 144 and overlying record 146 are in the ready position, and overlying them is another carrier accessory 148 and record 150. It should be noted that due to the support of the record 146 in the ready position by the cap 152 of the underlying carrier accessory 144, depending upon the record configuration, its thickness dimension and on the degree to which the cap 152 is designed to protrude at its maximum position, the outer surface of the upper cushioning layer 154 on the underlying carrier 144 may or may not contact the recording area of the overlying record 146, as illustrated by the small gap 156. However, the overlying carrier 148 and its overlying record 150 will nest, such that their support is derived from the recording area of the record 146 in the ready position through the layers of cushioning material 158, 160 of the overlying carrier 148 in the stack. Thus, in the stack, there is no contact between carrier accessories and records in the rim areas and none in the hub and label areas, except for the protruding cap of the accessory 144 in the ready position on the changer spindle.

Preparatory to dropping the carrier and record 144, 146 in the ready position, as shown in FIG. 9, the retaining cam 141 on the changer spindle 127 is actuated to protrude and exert pressure in the spindle hole of the overlying carrier 148, so that when the prongs retract to drop the carrier and record in the ready position, the cap 162 of the overlying carrier 148 will then move to and be held in a protruding position to support the overlying stack; and, once the prongs have reemerged and the retaining cam 141 has retracted, the stack will drop until the prongs engage the cap 162.

The records illustrated in FIG. 9 have enlarged rims and central label areas thereby giving them a recessed recording and lead-out area, with the label area tapering in thickness inwardly toward the spindle hole in the record. This configuration is typical of many modern records. It is pointed out here specifically however to illustrate an example of the nesting effect, which both minimizes the thickness of a stack and considerably enhances frictional coupling between interleaved carriers and records in the stack.

For example, in FIG. 9, the top record 150 in the stack has a raised rim area 164, a depressed recording area 166 joining with a depressed leadout area 168, all of which surround an elevated central label area 170. The internal and outside diameter of the annulus 160 of cushioning material on the underlying carrier 148 fall within the recessed recording and leadout areas, and the annulus of cushioning material protrudes sufficiently above the rim and hub of the carrier 148 that it constitutes the sole engagement of the carrier 148 with the record 150, and in fact engages within the recessed recording and leadout areas on the bottom of the record, while accommodating nesting space is provided for the enlarged rim and central label area of the record so that neither the record rim nor label area is in contact with the underlying carrier. By inspection, the same holds true in the relationship between the carrier 148 and the underlying record 146. The only exception is as between a carrier and record in the ready position.

FIG. 10 illustrates a phonograph record 172 and underlying carrier 174 in the ready position, the record having yet a different popular cross-sectional configuration where the central hub 176 of the record is raised and essentially flat without tapering toward the central hole. In the readyposition, the gap 178 between the outer surface of the upper layer of cushioning material 180 and the recording area on the bottom surface of the record 172 will exist, and normally will be greater than the gap 156 shown in FIG. 9 between the carrier 144 and the record 146 of tapered label area configuration. In either event, these gaps 156, 178 are quite small, and only obtained when the overlying record is supported on the top surface of the movable caps of the carriers in the ready position.

FIG. 11 illustrates a nested stack of interleaved carriers 182, 184 and phonograph records 186, 188 of different cross-sectional configurations centered by a spindle 189 and resting on a phonograph turntable 190. As can be seen from inspection, here the nesting is complete so that the entire support for the stack comes from the turntable through the cushioning material on the interleafed carriers, so that the entire support and rotary drive provided by the turntable is transmitted from the turntable to the topmost record 188 in the stack through the annuli of cushioning material, as opposed to some other contact between the records and carriers. For this to hold true in a universal sense for all record configurations, the caps 192, 194 of the carriers 182, 184 must be free to move downwardly from their previously protruding positions after the carriers drop from the changer spindle onto the turntable. The amount of downward movement required is of course a matter of degree depending upon the configuration of the overlying record. A clear example is shown for cap 192 in association with the flat raised label area or portion 196 of the overlying record 186. Here, the cap 192 returns to its position flush with the upper annular portion 198 of the hub of the carrier 182. If the cap was not permitted to return to this flush position, but instead protruded upwardly to a significant degree, it could contact the label portion 196 of the overlying record and elevate the record relative to the top surface of the upper layer of cushioning material 200 on the carrier 182, thereby interfering with the support and driving relationship between the carrier 182 and the overlying record 186.

Also illustrated in FIG. 11 is the fact that many turntables including turntable 190 shown have a patterned surface layer of rubber-like material 202 adapted to engage an overlying record. The bottom carrier 182 makes an excellent free turntable cover, and obviously its bottom annulus 204 of cushioning material readily engages the rubber-like surface pattern 202 in an excellent cushioned rotary drive relationship.

In use, the records and carrier accessories, being handled by their rims, are interleafed so that each record has an underlying carrier in a stack. Since the carriers have essentially the same diameter as the records, it is a simple proposition to insure that the spindle holes in the hub caps of the carriers are aligned with the spindle holes in the records in the stack. The stack is then placed upon a changer spindle of a phonograph, and the phonograph is played in the normal manner, each record in turn dropping with its underlying carrier after the previous record is played. The stack may be removed from the turntable in the same manner as a stack of records, and the stack may be then laid aside on a flat surface or, if desired, the entire stack with the interleafed carriers and an added overlying carrier may be placed in a storage container for permanent storage until reuse, so that the records are alsways stored between velvet cushioning material. Or, if desired, the records may be returned to individual storage and the carrier accessories may be used with other records to be played, thereby minimizing the number of carriers required by the user since they are free and separate from the records themselves.

While different forms of cushioning material are available and could be used, we have discovered that a precision cut upright fibrous pile fabric such as velvet offers some unique advantages in this particular application. Thickness dimensions are very important in this application, and velvet can be obtained in precise thickness dimensions which will be durably maintained during use for supporting phonograph records. The upstanding velvet fibers engage the recording grooves in the records and therefore constitute a good coupling medium for transmitting the rotary drive through a stack of records which can be particularly important when one of the records is slightly warped. The use of relatively thick layers of cushioning material such as velvet without undue addition to the thickness of a stack is permitted by the nexting relationship with contoured records, and these relatively thick layers in conjunction with the structural integrity of the rigid body of the accessory, tends to isolate warpage and reduce any tendency to transmit warpage from one record to another in a stack. Of course, the layers of cushioning material also help damp the transmission of undesirable mechanical vibrations from the turntable to the record or through a stack of records.

Moreover, since the surface of the velvet is merely a flat zone defined by the terminated ends of upstanding fibers, abrasive dust particles are not retained on the surface zone but fall down between the fibers of the velvet from which they can be easily removed by brushing or vacuuming, a cleaning operation that is further facilitated by the fact that the carrier accessory is a separate device rather than an attachment to a record. Also, velvet can be treated so that it functions to help discharge static electricity from records, and it can also be treated with bacteriacides and fungicides. Further, appearance is a very important factor in a home, particularly to an audiophile, and the carrier accessory being the same size as a record and containing a considerable expanse of velvet on both sides provides a remarkably attractive piece of equipment which fits the audio equipment appearance setting without smacking of gadgetry.

In regard to static electricity, phonograph records can acquire electrical charges either during manufacture or use resulting in intense and non-uniform electric fields emanating from the record which can have a modulating effect on some phonograph cartridges and which can attract and retain dust particles to the record grooves thus deteriorating the record, interfering with the sound reproduction and making the record difficult to clean.

As indicated, the velvet can be treated so that it functions to help discharge static electricity from records; for example, by treating the velvet so that it is electrically conductive. Since the velvet is mounted on an electrically conductive aluminum body, as with an electrically conductive cement, which body in turn engages the metal spindle of the phonograph, the phonograph grooves engaged by the upstanding velvet fibers are grounded to the phonograph spindle, thus providing a means for assisting in discharging some of the static electricity from the record and aiding in dislodging dust particles from the record grooves.

Moreover, the proximity of the underlying carrier accessory with the entire overlying phonograph record produces a space capacitor or shunting effect on the electric fields otherwise emanating from the top surface of the record, inasmuch as the body of the accessory is of electrically conductive aluminum. This reduces the electric fields available to modulate the phonograph cartridge and attract and retain dust particles at the exposed top surface of the record. Further, for the same reason, this is in aid of cleaning the record with the customary brushes and solutions available for that purpose.

The lamination of two body shells to form a hollow rim and hub provides considerable stiffness and rigidity to the carrier accessory while minimizing its weight and permitting a relatively thin flange area where thickness adds directly to the thickness of a stack. The use of an aluminum alloy, a light-weight non-ferrous metal, for the body shells provides the necessary strength, minimizes weight and insures that all areas of the carrier accessory that come into proximity with the phonograph cartridge are nonmagnetic. With the layers of cushioning matching the recording and leadout areas of the records, in annular form, the thickness of a record stack in which the carriers are interleafed is considerably reduced for most modern records by the accommodation of the raised rim and label areas of the records in the relieved spaces afforded at the rim and hub of the carrier accessory.

A further aspect of the universal application of the preferred embodiment of our invention resides in permitting the movable cap a maximum protruding position slightly above the upper surface zone of the top velvet annulus. By inspection of FIGS. 2(a) and 2(b), it can be seen that the top plate 72 of the movable cap 70 is permitted to protrude by as much as approximately 0.013 inches above the top surface 84 of the upper velvet layer 80. As a consequence when the carrier accessory underlies a warped record in the ready position on a changer spindle, the cap will still abut the label area of the overlying record, the warpage in which might otherwise, depending on the record configuration, cause the record to be supported on the upper velvet annulus of the accessory so that its label area bridges above the maximum protruding position of the cap to thereby add an excessive effective thickness which could cause injury to the spindle hole of the record or could result in the changer mechanism dropping the underlying accessory while retaining the record. While very severe warpage could be accommodated by permitting the cap to protrude even further, we do not consider this a problem worth addressing and moreover the elevation above the turntable of the underneath side of the carrier accessory in the ready position must be sufficient to permit the tone arm to operate beneath it.

The foregoing as well as many other advantages will be obvious to one skilled in the art, particularly in view of the foregoing explanation.

We claim:

1. For use in conjunction with a nominally 12 inch diameter record disc having a central label area surrounded by a recording area which is in turn surrounded by a rim area, a free and separate carrier accessory adapted to underlie, carry and drop to the turntable with the record disc through the changing and playing operation on the spindle of a record changing phonograph, comprising:

a generallly rigid circular disc-like supporting body having an overall diameter substantially equal to or greater than that of the record disc, the body including an elevated central hub and a substantially flat annular flange surrounding and extending outwardly from the elevated hub, the elevation of the hub being with respect to the flat annular flange, the elevated hub including a central portion which is exposed on both sides and has a spindle hole therein, and means for supporting said central portion in juxtaposition to an overlying record disc;

a layer of flexible cushioning material in the form of an annulus attached on and protruding from one side of the flange and surrounding the elevated hub for engaging the recording area of an overlying record disc; and, a layer of flexible cushioning material attached on the opposite side of the flange.

2. The apparatus of claim 1 wherein the layers of flexible cushioning material are in the form of annuli of precision-cut upright pile fabric attached concentrically on opposite sides of the flange for engaging the recording areas of overlying and underlying record discs, the annuli having inside and outer diameters falling between the label and rim areas of said record discs.

3. The apparatus of claim 1 wherein the central portion of the elevated hub is fixed in position, and wherein the means for supporting the central portion of the elevated hub in juxtaposition to an overlying record disc includes means fixing the central portion of the hub at a position above the flat annular flange and slightly below the outer surface of the layer of flexible cushioning material on said one side of the flange.

4. For use in conjunction with a nominally 12 inch diameter record disc having a central label area surrounded by a recording area, a free and separate carrier accessory adapted to underlie and carry the record disc in the playing operation on a phonograph, comprising:
a generally rigid disc-like supporting body having an overall diameter substantially equal to or greater than that of the record disc,
the body including an elevated central hub having a spindle hole therein, and a substantially flat annular flange surrounding and extending outwardly from the elevated hub, the elevation of the hub being with respect to the flat annular flange,
a layer of flexible cushioning material in the form of an annulus attached on and protruding from one side of the flange and surrounding the elevated hub for engaging the recording area of an overlying record disc; and,
a layer of flexible cushioning material attached on the opposite side of the flange,
with the central portion of the hub being free, and the means for supporting the central portion of the hub in juxtaposition to an overlying record disc comprising means mounting the central portion of the hub for sliding vertical movement between predetermined positions including a position approximately flush with or above the outer surface of the layer of flexible cushioning material on said one side of the flange.

5. For use in conjunction with a nominally 12 inch diameter record disc having a central label area surrounded by a recording area which is in turn surrounded by a rim area, a free and separate carrier accessory adapted to underlie and carry the record disc in the playing operation on a phonograph, comprising:
a generally circular disc-like supporting body having a spindle hole centrally therein and having an overall diameter substantially equal to or greater than that of the record disc; and,
a layer of flexible cushioning material in the form of an annulus of precision cut upright pile fabric attached concentrically on one side of the body for engaging the recording area of an overlying record disc, the annulus having an inside diameter greater than the outside diameter of the label area of the record disc, and the annulus having an outside diameter sufficiently less than that of the record disc to clear said rim area thereof.

6. For use in conjunction with a nominally 12 inch diameter record disc having a central label area surrounded by a recording area, a free and separate carrier accessory adapted to underlie and carry the record disc in the playing operation on the turntable of a phonograph, comprising:
a generally circular disc-like supporting body having an overall diameter substantially equal to or greater than that of a record disc,
the body including an elevated central hub having a spindle hole therein, an elevated outer rim, and a substantially flat annular flange joining the rim with the hub, the elevation of the central hub and outer rim being with respect to the flat annular flange,
the elevated outer rim having an inner perimeter defined on one side of the body by a circular abutment edge having a diameter substantially equal to or less than the outer diameter of the record disc recording area, and the elevated central hub having an outer perimeter defined on the same side of the body by a circular abutment edge having a diameter exceeding that of the record disc label area;
a layer of flexible cushioning material in the form of an annulus of precision-cut upright pile fabric attached concentrically on the flange on said one side of the body and extending between and to an elevation above said abutment edges defining the inner and outer perimeters of the rim and hub respectively for engaging the recording area of an overlying record disc; and,
a layer of flexible cushioning material attached to the flange on the opposite side of the body.

7. For use in conjunction with a nominally 12 inch diameter record disc having a central label area surrounded by a recording area, a free and separate carrier accessory adapted to underlie, carry and drop with the record disc through the changing and playing operation on the spindle of a record changer, comprising:
a generally disc-like supporting body having an overall diameter substantially equal to or greater than that of the record disc,
the body including an elevated hollow central hub, an elevated hollow outer rim, and a substantially flat annular flange joining the rim with the hub, the elevation of the central hub and the outer rim being with respect to the flat annular flange,
the hub including a relatively thin central portion exposed on both sides and having a spindle hole therein, and means for supporting said central portion in juxtaposition to an overlying record disc; and,
layer of flexible cushioning material attached respectively on opposite sides of the flange for engaging the recording area of overlying and underlying record discs.

8. The apparatus of claim 7 wherein the elevated hollow outer rim has an inner perimeter defined on both sides of the body by circular abutment edges having a diameter substantially equal to or less than the outer diameter of the recording area on the record disc; wherein the elevated hollow central hub has an outer perimeter defined on both sides of the body by circular abutment edges having a diameter approximately equal to or greater than the outside diameter of the label area of the record disc; and, wherein the top and bottom layers of cushioning material extend between and protrude to an elevation beyond said abutment edges defining the inner and outer perimeters of the rim and hub respectively on opposite sides of the body.

9. The apparatus of claim 7 wherein at least the layer of flexible cushioning material for engaging the recording area of an overlying record disc is in the form of an annulus of velvet.

10. For use in conjunction with a nominally 12 inch diameter record disc having a central label area surrounded by a recording area, a free and separate carrier accessory adapted to underlie, carry and drop with the record disc through the changing and playing operation on the spindle of a record changer, comprising:

a generally disc-like supporting body having an overall diameter substantially equal to or greater than that of the record disc, the body including a substantially flat annular flange which surrounds and extends outwardly from an elevated central hub, the elevation of the central hub being with respect to the flat annular flange, the hub comprising an annular portion having an inner perimeter defining a central opening through the hub, a cap extending across said central opening and having a spindle hole therein, and means mounting the cap for limited vertical movement between two predetermined positions, including a protruding position relative to the annular portion of the hub; and, layers of flexible cushioning material attached respectively on opposite sides of the flange for engaging overlying and underlying record discs, the outer surface of each layer being elevated relative to the annular portion of the hub.

11. The carrier accessory of claim 10 wherein the cap is a free member comprising a plate portion exposed on both sides and having the spindle hole therein, a skirt portion, and a flange portion extending laterally from the skirt portion, and wherein the means mounting the cap comprises means restricting vertical movement of said flange portion and means slidably engaging said skirt portion and restricting lateral movement thereof.

12. For use in conjunction with a nominally 12 inch diameter record disc having a central label area surrounded by a recording area, a free and separate carrier accessory adapted to underlie, carry and drop with the record disc through the changing and playing operation on the spindle of a record changer, comprising:

a generally disc-like supporting body having an overall diameter substantially equal to or greater than that of the record disc;

the body including top and bottom shells connected together to form an elevated hollow central hub, an elevated hollow outer rim, and a substantially flat annular flange joining the rim with the hub, the top and bottom shells each having a central opening therein, the elevation of the central hub and the outer rim being with respect to the flat annular flange, the hub including a free cap captured in the central opening of the top shell and having a spindle hole therein, the cap having portions captured between the top and bottom shells for limiting vertical movement of the cap to between predetermined positions including one position where the cap protrudes from the top shell; and, layers of flexible cushioning material in the form of annuli attached respectively on opposite sides of the flange and extending between the hub and rim for engaging the recording area of overlying and underlying record discs.

13. For use in conjunction with a nominally 12 inch diameter record disc having a central label area surrounded by a recording area, a free and separate carrier accessory adapted to underlie, carry and drop to the turntable with the record disc through the changing and playing operation on the spindle of a record changer, comprising:

a generally disc-like supporting body having an overall diameter substantially equal to or greater than that of the record disc, the body including top and bottom shells connected together to form an elevated hollow central hub, an elevated hollow outer rim, and a substantially flat annular flange joining the rim with the hub, the top and bottom shells each having a central opening therein, the elevation of the central hub and the outer rim being with respect to the flat annular flange, the outer rim having an inner perimeter defined on both the top and bottom body shells by circular abutment edges thereon, the central hub having an outer perimeter defined on both the top and bottom shells by circular abutment edges thereon each having a diameter exceeding that of the record disc label area, so that the hub on both sides of the body has a raised annular portion the respective perimeters of which define the circular openings and abutment edges, the hub including a free cap captured in the central opening of the top shell, the cap including a substantially flat upper plate portion spanning the central opening in the top shell and exposed on both sides and having a central spindle hole therein, a skirt portion which depends from the plate, and a flange portion extending laterally from the skirt, said flange being captured between the top and bottom shells for limiting vertical movement of the cap to between a position where the plate is approximately flush with the upper surface of the annular hub portion and a position where the plate and supporting skirt protrudes above the top surface of the annular hub portion, with the skirt slidably engaging the perimeter of said opening in the top shell so as to restrict lateral movement of the cap to a negligible degree of movement; and, layers of flexible cushioning material disposed respectively on opposite sides of the flange for engaging the recording area of overlying and underlying record discs, each layer being in the form of an annulus of precision-cut upright pile fabric extending between and protruding to a level above the respective abutment edges of the hub and rim so as to constitute the sole engagement with overlying and underlying record discs when disposed on the turntable for the record changer.

14. For use in conjunction with a nominally 12 inch diameter record disc having a central label area surrounded by a recording area, a free and separate carrier accessory adapted to underlie and carry the record disc in the playing operation on a phonograph, comprising:

a generally circular disc-like supporting body having a central spindle hole therein and having an overall diameter substantially equal to or greater than that of the record disc;

said supporting body being electrically conductive; and, a layer of flexible cushioning material in the form of an annulus of precision-cut upright pile fabric attached on one side of the body for engaging the recording area of an overlying record disc, said fabric being electrically conductive.

* * * * *